United States Patent
Caballero et al.

(10) Patent No.: US 10,636,175 B2
(45) Date of Patent: Apr. 28, 2020

(54) DYNAMIC MASK APPLICATION

(71) Applicant: Facebook, Inc., Menlo Park, CA (US)

(72) Inventors: Maria Luz Caballero, San Francisco, CA (US); Molly Jane Fowler, San Francisco, CA (US); Congxi Lu, Los Angeles, CA (US); Charles Joseph Hodgkins, San Francisco, CA (US); Daniel Moreno Cuellar, Los Angeles, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/388,846

(22) Filed: Dec. 22, 2016

(65) Prior Publication Data

US 2018/0182141 A1    Jun. 28, 2018

(51) Int. Cl.
*G06T 11/00* (2006.01)
*G06K 9/00* (2006.01)

(52) U.S. Cl.
CPC .......... *G06T 11/00* (2013.01); *G06K 9/00228* (2013.01); *G06K 9/00302* (2013.01)

(58) Field of Classification Search
None
See application file for complete search history.

(56) References Cited

U.S. PATENT DOCUMENTS

| | | | | |
|---|---|---|---|---|
| 8,401,248 B1 * | 3/2013 | Moon | ............... | G06Q 30/0242 382/103 |
| 8,760,551 B2 * | 6/2014 | Haikin | ............... | H04N 1/00167 348/231.3 |
| 8,854,491 B2 * | 10/2014 | Ford | ............... | H04N 5/23219 348/211.3 |
| 8,887,300 B1 * | 11/2014 | Gates | ............... | H04L 63/10 713/168 |
| 9,104,908 B1 * | 8/2015 | Rogers | ............... | G06K 9/00315 |
| 9,225,897 B1 * | 12/2015 | Sehn | ............... | H04N 5/23222 |
| 9,245,176 B2 * | 1/2016 | Matthews | ............... | G06T 13/40 |
| 9,716,599 B1 * | 7/2017 | Gates | ............... | H04L 12/58 |
| 10,002,452 B2 * | 6/2018 | Wu | ............... | G06T 11/60 |

(Continued)

OTHER PUBLICATIONS

Liba, Face and Photograph Augmentation Based on a Custom Theme, 2015, Stanford University, pp. 1-6.*

(Continued)

*Primary Examiner* — Motilewa Good Johnson
(74) *Attorney, Agent, or Firm* — Baker Botts L.L.P.

(57) ABSTRACT

In one embodiment, a method includes identifying an emotion associated with an identified first object in one or more input images, selecting, based on the emotion, a mask from a set of masks, where the mask specifies one or more mask effects, and for each of the input images, applying the mask to the input image. Applying the mask includes generating graphical features based on the identified first object or a second object in the input images according to instructions specified by the mask effects, and incorporating the graphical features into an output image. The emotion may be identified based on graphical features of the identified first object. The graphical features of the identified object may include facial features. The selected mask may be selected from a lookup table that maps the identified emotion to the selected mask.

25 Claims, 9 Drawing Sheets

(56) References Cited

U.S. PATENT DOCUMENTS

| | | | | |
|---|---|---|---|---|
| 2002/0041285 | A1* | 4/2002 | Hunter | G06T 3/0093 |
| | | | | 345/474 |
| 2007/0242066 | A1* | 10/2007 | Levy Rosenthal | H04N 5/272 |
| | | | | 345/419 |
| 2009/0016617 | A1* | 1/2009 | Bregman-Amitai | |
| | | | | G06K 9/00281 |
| | | | | 382/229 |
| 2009/0285456 | A1* | 11/2009 | Moon | G06K 9/00335 |
| | | | | 382/118 |
| 2010/0214483 | A1* | 8/2010 | Gann | G06K 9/00624 |
| | | | | 348/578 |
| 2011/0296324 | A1* | 12/2011 | Goossens | G06Q 10/10 |
| | | | | 715/763 |
| 2012/0130717 | A1* | 5/2012 | Xu | G06T 13/40 |
| | | | | 704/258 |
| 2012/0307096 | A1* | 12/2012 | Ford | H04N 5/23219 |
| | | | | 348/222.1 |
| 2014/0112585 | A1* | 4/2014 | Kawanishi | G06T 11/60 |
| | | | | 382/217 |
| 2014/0192229 | A1* | 7/2014 | Kim | G06K 9/00302 |
| | | | | 348/231.3 |
| 2014/0376785 | A1* | 12/2014 | Bathiche | G06K 9/00335 |
| | | | | 382/118 |
| 2015/0116529 | A1* | 4/2015 | Wu | H04N 5/23222 |
| | | | | 348/222.1 |
| 2016/0050169 | A1* | 2/2016 | Ben Atar | H04M 1/72544 |
| | | | | 709/206 |
| 2016/0117592 | A1* | 4/2016 | Jung | G06Q 30/02 |
| | | | | 706/12 |
| 2016/0191958 | A1* | 6/2016 | Nauseef | H04N 21/23418 |
| | | | | 725/116 |
| 2016/0328875 | A1* | 11/2016 | Fang | G06T 13/40 |
| 2016/0379047 | A1* | 12/2016 | Natan | G06K 9/00281 |
| | | | | 382/201 |
| 2017/0047096 | A1* | 2/2017 | Li | G11B 27/34 |
| 2017/0109603 | A1* | 4/2017 | Wang | G06K 9/4671 |
| 2017/0309051 | A1* | 10/2017 | Yamasaki | G06T 11/60 |

OTHER PUBLICATIONS

Wallraven et al., The evaluation of stylized facial expressions, Jul. 28-29, 2006, ACM, pp. 85-92, 177.*

Stolz, Spotlight on Snapchat. Law JOurnal Library, TALL Quaterly 36, 2016-2017, p. 36 (Year: 2017).*

Bartlett et al., Real Time Detection and Facial Expression Recognition: Development and Applications to Human Computer Interaction, IEEE 2003, Proceedings of the 2003 Conference on Computer Vision and Pattern Recognition Workshop (Year: 2003).*

* cited by examiner

400

| EMOTION | MASK NAME |
|---|---|
| Happiness | Happy Panda |
| Surprise | Surprised Eyes |
| Anger | Angry Bird |
| Sadness | Gushing Tears |

| MASK SELECTION FACTORS ||||||||||  MASK NAME |
| Emotion ||||| | Theme | Location | Age | Gender | |
| Anger | Happiness | Sadness | Surprise | Disgust | Fear | | | | | |
| 0.00 | 1.00 | 0.00 | 0.00 | 0.00 | 0.00 | Animals | Zoo | "1-18" | F | Happy Panda |
| 0.00 | 0.00 | 0.00 | 1.00 | 0.00 | 0.00 | | | | | Surprised Eyes |
| 1.00 | 0.00 | 0.00 | 0.00 | 0.00 | 0.00 | Games | | "1-30" | | Angry Bird |
| 0.00 | 0.10 | 0.90 | 0.00 | 0.00 | 0.00 | | | | | Gushing Tears |

| MASK NAME | MASK IMAGE | MASK IMAGE GEOMETRY ||| MASK INSTRUCTIONS |
| | | Eye Location<br>(L, R, T, B) | Nose Location<br>(L, R, T, B) | Mouth Location<br>(L, R, T, B) | |
| Happy Panda | panda.jpg | {PandaEyeCoords} | {PandaNoseCoords} | {PandaMouthCoords} | [geometry mapping] |
| Surprised Eyes | surprised.jpg | {SurprisedEyeCoords} | {SurprisedNoseCoords} | {SurprisedMouthCoords} | [rendering code] |
| Angry Bird | angry.jpg | {BirdEyeCoords} | {BirdNoseCoords} | {BirdMouthCoords} | [rendering code] |
| Gushing Tears | tear.jpg | Not applicable | Not applicable | Not applicable | [rendering code] |

*FIG. 4C*

DYNAMIC MASK APPLICATION

TECHNICAL FIELD

This disclosure generally relates to selecting dynamic masks based upon graphical features in images.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a system may automatically select a dynamic mask to be applied to a human face, head, or other object depicted in an image or video. The dynamic mask may include a set of mask effects that can generate graphical features, e.g., larger eyes, a hat, a face painting, or the like, to be shown on or near the object from the image or video. For example, the dynamic mask may be applied to the image or video to produce an output image or video that includes graphical features generated using the mask effects. The graphical features may move and change shape in an output video as the object in the input video moves, so that the mask appears to be worn or linked to the object in the input video. Selecting a mask that corresponds to users' emotions allows users to be more expressive, e.g., by exaggerating their emotions.

The dynamic mask may be automatically selected from a set of masks stored in a database or the like. The selection may be based on one or more emotions identified in the image or video. The emotions may be identified from, for example, a facial expression detected in the object. The selection may be performed by searching a mapping table or the like for one or more identified emotions. If one emotion is detected, then the mapping table may be searched for an entry that maps the emotion to a particular dynamic mask to be used as the selected mask. If multiple emotions are detected, then a mapping table that associates multiple emotions, e.g., having associated threshold confidence values, with each dynamic mask may be used to select a dynamic mask having corresponding confidence values that satisfy the thresholds.

In particular embodiments, other factors, including user-related information such as user interests, e.g., themes such as animals or movies, social data such as friends on a social-networking system, or location data, e.g., the user being located at a zoo, may be used to select the dynamic mask. These factors may be combined with emotion detection so that, for example, detection of an emotion with a low or medium confidence level may be combined with the user's interest in the animal theme or visit to a zoo to select a mask associated with the emotion and with an animal theme or a zoo location.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4A illustrates an example emotion-to-mask mapping table.

FIG. 4B illustrates an example dynamic mask selection table.

FIG. 4C illustrates an example dynamic mask database.

DESCRIPTION OF EXAMPLE EMBODIMENTS

Figure 1:
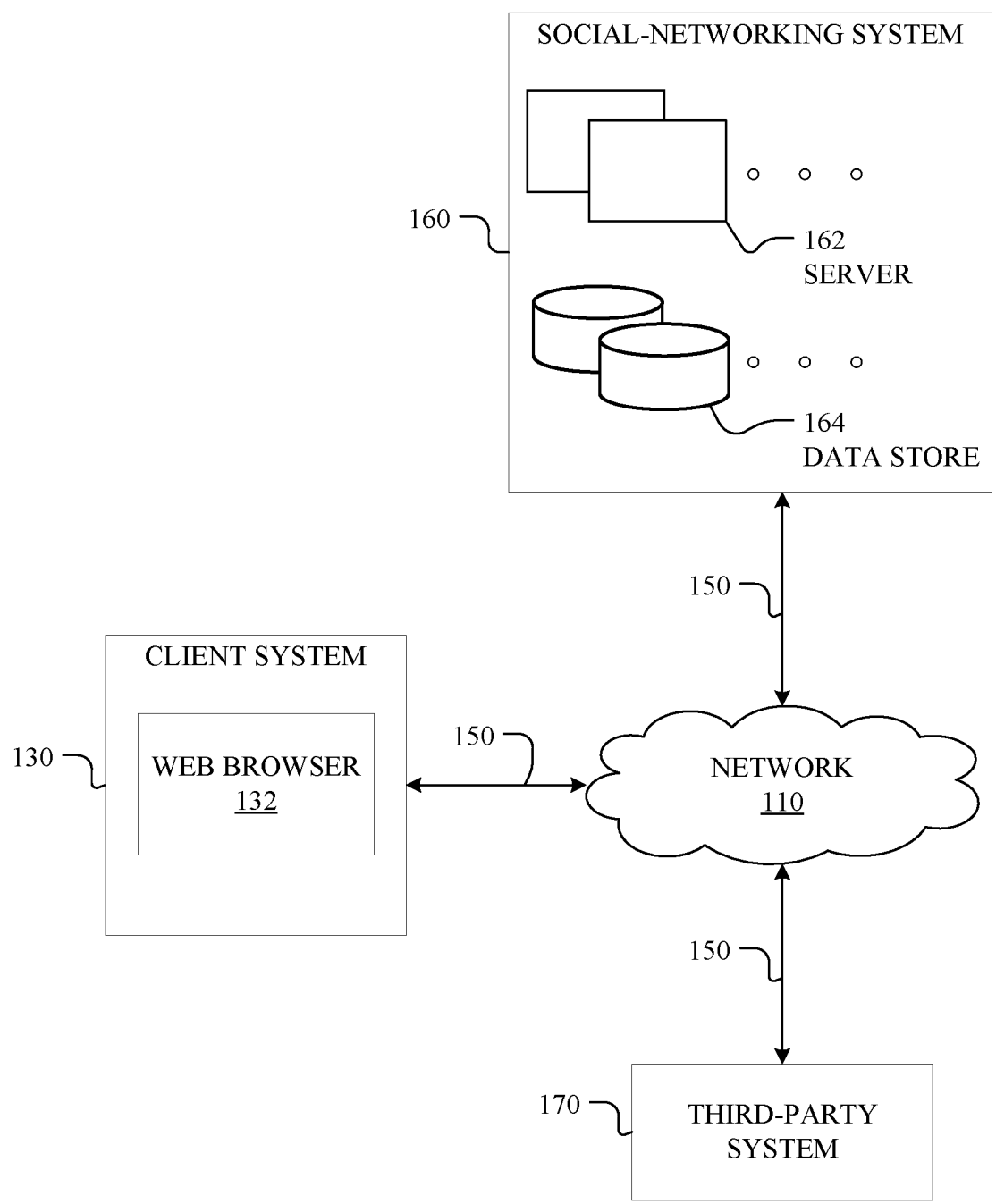
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
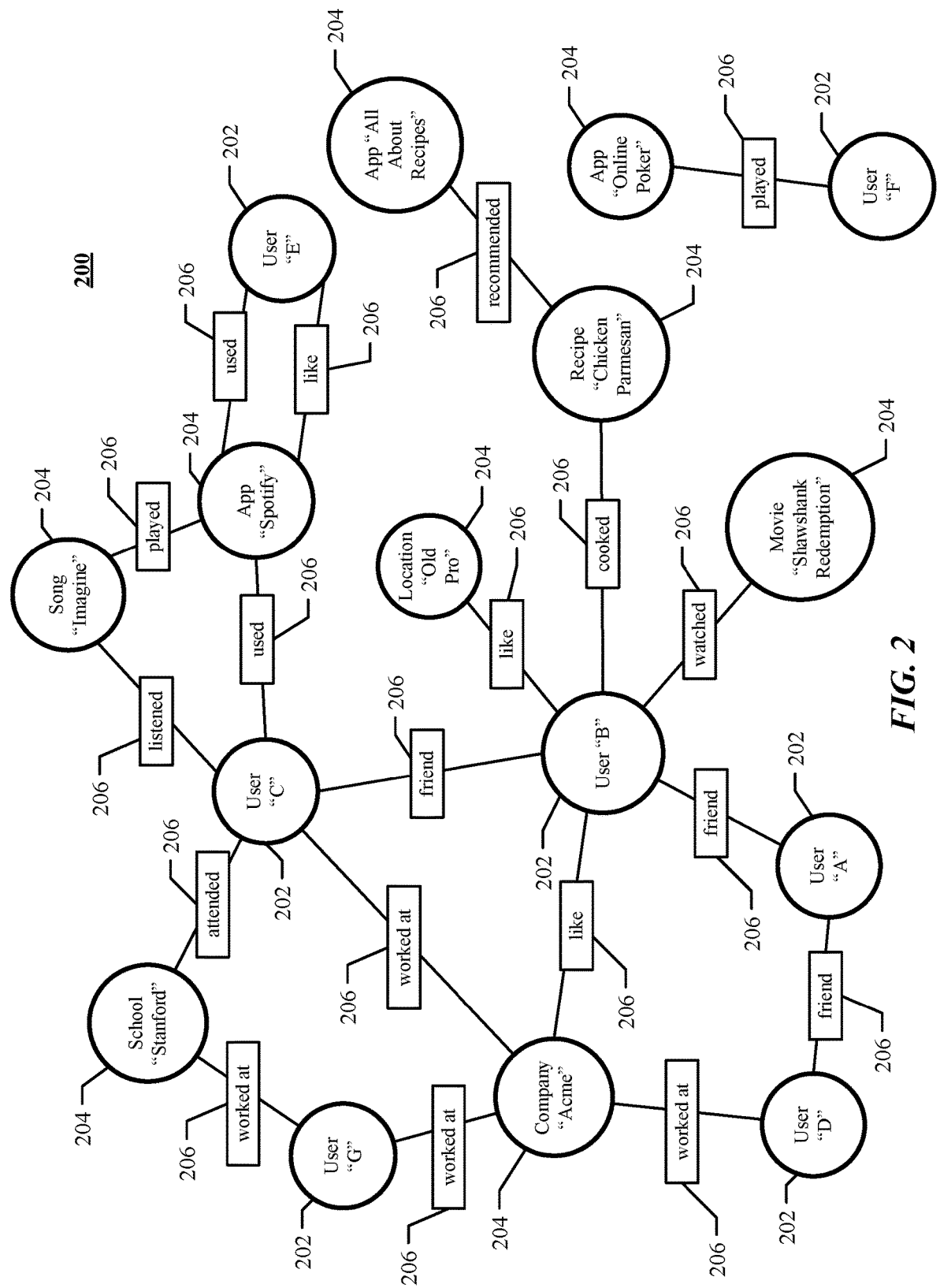
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, a system may automatically select a dynamic mask to be applied to a human face, head, or other object depicted in an image or video. The dynamic mask may include a set of mask effects that can generate graphical features, e.g., larger eyes, a hat, a face painting, or the like, to be shown on or near the object from the image or video. For example, the dynamic mask may be applied to the image or video to produce an output image or video that includes graphical features generated using the mask effects. The graphical features may move and change shape in an output video as the object in the input video moves, so that the mask appears to be worn or linked to the object in the input video. Selecting a mask that corresponds to users' emotions allows users to be more expressive, e.g., by exaggerating their emotions.

The dynamic mask may be automatically selected from a set of masks stored in a database or the like. The selection may be based on one or more emotions identified in the image or video. The emotions may be identified from, for example, a facial expression detected in the object. The selection may be performed by searching a mapping table or the like for one or more identified emotions. If one emotion is detected, then the mapping table may be searched for an entry that maps the emotion to a particular dynamic mask to be used as the selected mask. For example, if surprise is detected in a video, then a "surprised eyes" dynamic mask associated with the emotion of surprise may be selected.

In particular embodiments, if multiple emotions are detected, then a mapping table that associates multiple emotions, e.g., with associated threshold confidence values, with each dynamic mask may be used to select a dynamic mask for which the emotion and its associated confidence values satisfy, or most closely satisfy, the threshold confidence values. For example, detecting emotions may involve uncertainty, which may be represented as a confidence value between 0 and 1, with 0 representing the lowest confidence and 1 representing the highest confidence. In particular embodiments, the mapping table may associate threshold emotion confidence values with each dynamic mask, so that a mask is selected if one or more of its emotion threshold values are satisfied by the confidence values associated with corresponding detected emotions. For example, if a "gushing tears" mask is associated by the mapping table with a sadness confidence threshold of 0.5 and a happiness confidence threshold of 0.5, then the gushing tears mask may be selected if both happiness and sadness are detected with confidence values of 0.5 or more for each emotion.

In particular embodiments, other factors, including user-related information such as user interests, e.g., themes such as animals or movies, social data such as friends on a social-networking system, or location data, e.g., the user being located at a zoo, may be used to select the dynamic mask. The user may be the user who performed an operation that caused a mask to be selected, or a user identified in the input image or video using facial recognition, for example. The selection of the mask may also be based on contextual features detected in the video. The contextual features may include items shown in the background of the image that are not part of the face, information about the person whose face is shown, and other contextual information, such as geographic location, time of day, and so on. For example, if a user is at a zoo looking at a panda and a digital photograph is taken of his or her face having a happy expression, then a happy panda face mask may be selected for the user based on the user's happy expression and the input image of the panda detected by a camera (e.g., a camera on the user's smartphone) in the background behind the user's face.

In particular embodiments, a machine learning algorithm may be trained to select masks based on information about past mask selections by the user or by other users, such as the user's friends, on the social-networking system 160. Dynamic masks 360 having themes or categories that the user likes or masks that the user selects often or sends or saves often may be used to train the machine learning algorithm. As another example, dynamic masks 360 that are often chosen by other users in the user's demographic (e.g., 13-year-old girls, 25-year-old-men, students at a particular school, and so on) may be more likely to be selected automatically for the user than other masks, so the machine learning algorithm may be trained using such demographic information and associated masks that are selected by users in particular demographic categories. The machine-learning algorithm may then be used to select masks. Masks that are often selected in particular contexts may be more likely to be selected in subsequent mask selection operations in those contexts.

The mask selection factors 354-362 may be combined with emotion detection so that, for example, detection of an emotion with a low or medium confidence level may be combined with the user's interest in the animal theme or visit to a zoo to select a mask associated with the emotion and with an animal theme or a zoo location. For example, the mapping table may indicate that a happy panda mask can be selected when the user is interested in the "animals" theme or is located at a zoo, and the emotion of happiness is detected with low (e.g., less than 0.1) or medium (e.g., less than 0.5) confidence.

In particular embodiments, when a dynamic mask has been selected, an output image or video may be generated by applying the mask to the input image or video. A dynamic mask may be applied to an image or video by, for example, rendering graphical features generated according to the mask on or near the object in the video. The graphical features may be rendered in the output images superimposed on or in association with the object. The graphical features may include, e.g., eyes, eyebrows, images of other physical objects, or any other defined region of an image. The graphical features may be rendered differently in successive output images, e.g., animated based on movements of the object in corresponding successive input images. The input images may be frames of an input video, and the output images may be frames of an output video.

Figure 3:
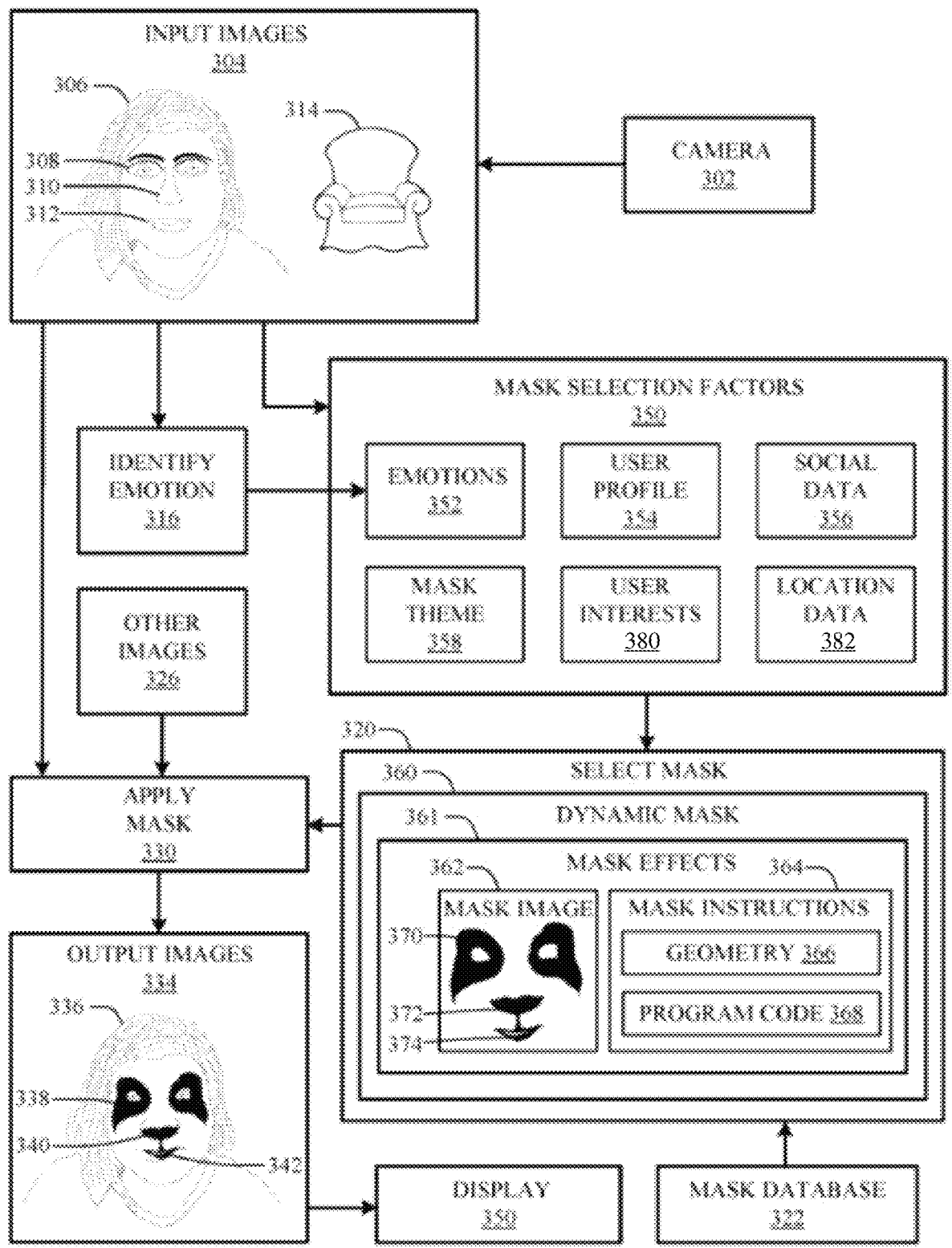
FIG. 3 illustrates an example dynamic mask selection system.

FIG. 3 illustrates an example dynamic mask selection system 300. The system 300 may receive one or more input images 304, e.g., from a camera 302, identify one or more emotions 352 based on the input images 304, select a dynamic mask 360 from a mask database 322 based on one or more mask selection factors 350, and apply the mask 360 to the input images 304 and/or other images 326 to generate output images 334. The output images 334 may be displayed on a display 350 of the client device 130. As another example, the output images 334 may be stored on a storage medium, e.g., on a storage device 906 or in a memory 904 of the client device 130, from which they may be subsequently accessed and displayed on the display 350, sent to other users via messages, email, or the like, shared or posted on the social-networking system 160, and so on. The output images 334 may be otherwise made available to the user of the client device in any suitable way.

In particular embodiments, the system 300 may be implemented by, for example, a computer program that can be executed on one or more servers 162, on one or more client systems 130, or on a combination of those. The system 300 may include a camera 302, which may generate the input images 304. A plurality of input images 904 may correspond to a video Each of the input images 304 may be an individual still image, e.g., a digital photograph, or a frame of a video, for example. The input images 304 may be received from sources other than the camera 302, e.g., from files or databases, and may be processed, edited, or otherwise modified prior to being received by the system 300. The input images 304 and output images 334 may be in formats such as GRAPHICS INTERCHANGE FORMAT (GIF), JOINT PHOTOGRAPHIC EXPERTS GROUP (JPEG), AUDIO VIDEO INTERLEAVED (AVI), MOVING PICTURE EXPERTS GROUP (MPEG-1, MPEG-2), WINDOWS MEDIA VIDEO (WMV), QUICKTIME, H.264, or the like. The input images 304 and output images 334 may have associated resolutions, e.g., 640×400 pixels, 1280×960 (1 megapixel) 1920×1080 (1080p) pixels, or the like, and each pixel may have an associated color. In particular embodiments, a plurality of output images may correspond to a video in which the output images may be rendered in succession at a particular frame rate. A video may be represented as a stream of data such as a file. A video may include one or more frames, and each frame may be processed individually, e.g., as an individual image. Operations such as identifying objects and rendering mask effects may be performed on the individual images. Optionally, operations may be performed on multiple images, e.g., on a sequence of images. For example, if a human face depicted in a video changes over time, the changes may be identified as corresponding to a particular emotion. Each frame may be processed individually using techniques described herein.

In particular embodiments, each input image 304 may include one or more objects 306. An object 306 may be understood as a portion of an image that represents a physical object. As an example, an object 306 may be an image of person, a person's head, a person's face, an animal, or other type of object, such as an item of furniture, within an image 304. Objects 306 may be images of real-world people, places, or things, or images of virtual objects such as emoji or other non-real-world objects. An object 306 may have one or more graphical features, such as the eyes 308, nose 310, and mouth 312. The features may be referred to herein as graphical features, since they correspond to portions of input images 304, and the input images 304 may be referred to as graphical images. One or more objects 336 may be rendered in the output image 334. Each object in the output image 334 may have one or more graphical features, such as panda eyes 338, panda nose 340, and panda mouth 342. The graphical features of the output image 334 may be generated by based on the dynamic mask 360, e.g., by combining an object 306 in the input image with a mask image 362 in accordance with mask instructions 364 to form an object 336 in the output image 334.

In particular embodiments, a dynamic mask 360 may be used to generate a graphical representation of a real-world mask that may cover at least a portion an object 306, such as a person's face, in an image. The graphical representation may be rendered as one or more output images 334, and may be understood as a modified version of the face in the input images, with graphical features generated using the mask effects 361. In particular embodiments, as introduced above, a dynamic mask 360 may generate a set of graphical features, such as stylized facial features, e.g., enlarged eyes, a hat, a face painting, or the like, to be shown on or near an object 336 in output images 334. The dynamic mask 360 may include or be associated with one or more mask effects 361 that may be used to generate particular features. Each mask effect 361 may include a mask image 362 and/or mask instructions 364. Each mask image 362 may be an image of the graphical features associated with the mask, e.g., a JPEG, GIF, or other type of image. The mask instructions 364 may specify how the mask images 362 are to be applied to an input image 304. For example, a mask image 362 may be applied to an input image 304 by replacing pixels of the input image 304 with pixels from the mask image 362. Note that the input image 304 itself need not be modified; the input image 304 may be copied to form the output image 334, and the portions of the output image 334 that are to be replaced by the pixels from the mask image 362 may be copied from or overwritten by the pixels from the mask image 362.

In particular embodiments, the mask effects 361 may generate graphical features 338, 340, 342 to be included in the output images 334. The graphical features may be, for example, repositioned or resized facial features, animal face features such as eyes, nose, teeth, whiskers, ears, and fur, a beard, laser beams, and so on, that may be rendered on or near the object in the output image. Other mask effects 361 may include a hat or other object to be rendered near the top of a face or head detected in an input video. Dynamic masks 360 may be applied to objects such as human heads, faces, hands, individual facial features (e.g., eyes), to animals, animal faces, and to other objects such as furniture items (e.g., chairs), toys, photographs, videos, cars, buildings, and other objects.

The graphical features may be incorporated into the output images 334. The process of incorporating graphical features into the output images 334 is referred to herein as applying the dynamic mask 360 to the input images 304 to generate the output images 334. For example, the output images 334 may be copies of the input images 304 in which portions of the input images 304 are replaced by the graphical features 338, 340, 342 generated by applying the dynamic mask 360 to the input images 304. Audio features such as sound files, e.g., recorded laughter, crying, or other sounds, may be associated with a dynamic mask 360. The associated sounds may be played audibly when the mask is selected or at other times, e.g., when an output image 334 showing the mask applied to an object is displayed.

Figure 9A:
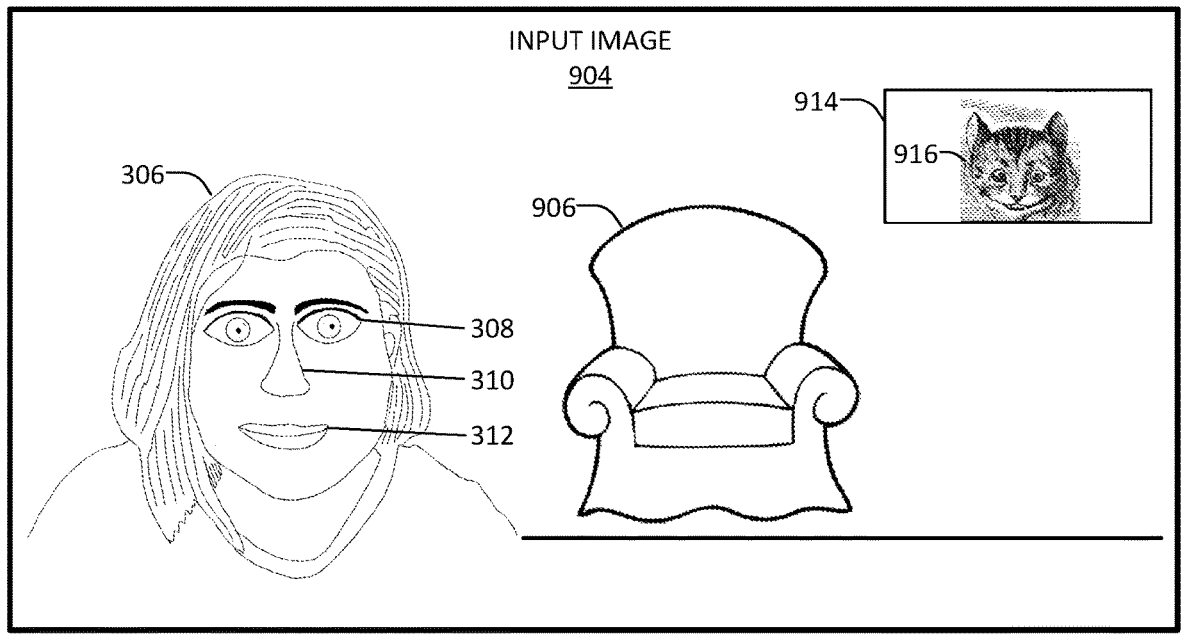
FIG. 9A illustrates an example input image having multiple objects.

In particular embodiments, a dynamic mask 360 may be selected based on a first object in an input image, e.g., the face object 306, and applied to a second object in the input image, e.g., the chair object 314. That is, the dynamic mask 360 may be applied to an object in the input image 304 other than the object 306 to form the object 336. Thus, the object to which the dynamic mask is applied (e.g., onto which the dynamic mask image 362 is rendered) may be the object 306 from which an emotion 352 is identified. Alternatively, the object to which the dynamic mask is applied may be an object 314 other than the object 306 from which the emotion 362 is identified. The object 314 to which the mask is applied may be identified automatically, e.g., by identifying the largest or most prominent object in the input image 304 that has features of a face. Alternatively, the location of the first and/or second object may be identified manually, e.g., by a user indicating a point on or a perimeter around the second object 314, or otherwise indicating the identity (e.g., by name, such as "chair" or "cat") or location of the second object 314 (e.g., by drawing a boundary around the second object). FIG. 9A shows an example object 936 produced by applying the mask 360 to the chair 314.

In particular embodiments, a dynamic mask 360's shape and size may be changed when the mask is applied to match the shape and size of an object 336. The shape and size of the mask image 362 may be adjusted, e.g., by stretching or compressing the image in the x and/or y direction, to fit an image of a face or other object 336 in the output image 334. For example, the effect of applying a dynamic mask 360 that represents panda face features is illustrated in the output image 334. The panda face dynamic mask 360 may include one or more images 362 of panda face features, such as eye shapes 370, a nose shape 372, and a mouth shape 374 to be included in the output image 334 at locations that are based on the locations of the eyes 308, nose 310, and mouth 312 of the object 306 in the input image. In the example of FIG. 3, the panda face dynamic mask 360 has been applied to the person's head 306 from the input image 304 by the mask application component 330 to generate the output image 334. The result of applying the mask 360 to the object 306 is an output image 334 that includes a face 336 into which the panda face features 370, 372, 374 have been incorporated at the locations of corresponding features of the face 336: the eyes 338, nose 340, and mouth 342.

In particular embodiments, a dynamic mask may include mask instructions 364, which may specify or determine the locations of pixels in the output image whose values are to be copied from pixels from the mask image. In one implementation, which may be a default implementation or may be selected by one or more mask instructions, the dimensions of the input and output images 304, 334 in pixels may be predetermined sizes, e.g., 1280×800 pixels. A dynamic mask 360 may then be implemented using a mask image 362 of the same dimensions as the input and output images, and pixels of the mask image 362 may be copied to corresponding locations (e.g., the same coordinates) in the output image 334 when the mask 360 is applied. In this implementation, pixels in the mask image 362 of a defined color, e.g., white, are not copied from the mask image 362 onto the output image when the mask is applied. That is, the pixels of the defined color in the mask image 362 behave as if they are transparent.

In particular embodiments, when the dynamic mask 360 is being applied to another image, such as a copy of the input image 304 to be used as the output image 334, pixels in the mask image 362 of the defined color do not overwrite the corresponding pixels in the input image 304, while pixels of other colors in the mask image 362 replace the corresponding pixels in the input image 304. In this way, a mask image 362 may define mask effects 361 to be applied to an input image 304 while leaving portions of the input image 304 not covered by the mask effects 361 unchanged. In the output image 334 of FIG. 3, a mask image 362 may be an image of the same size as the input image 304 or output image 334, and may include only the black regions 338, 340, 342. When the dynamic mask 360 is applied to the input image 304, the black regions 338, 340, 342 replace the regions at the corresponding locations in the input image 304, and the other portions of the input image 304, such as the outline of the face, are copied to the output image 334. The mask image 362 need not be the same size as the input image 304 or output image 334. For example, the mask instructions may indicate that the mask image 362 is to be scaled to match the size of the input image 304 prior to being applied to the input image 304.

In particular embodiments, to improve the fit of a dynamic mask 360 to the object 306 to which the dynamic mask 360 is being applied, the dynamic mask instructions 364 may include mask image geometry information 366 that identifies the locations of features of the mask image 362, such as eyes 370, a nose 372, and a mouth 374. The locations of corresponding existing features on the input image 304, such as the eyes 308, nose 310, and mouth 312, may be automatically identified, e.g., using face recognition, image segmentation, or other appropriate technique. The mask image 362 may then be resized, reshaped, or otherwise modified so that features of the mask image 362 that correspond to existing features of the input image 304 to which the mask image 362 is being applied are aligned at the same or similar positions as the corresponding features of the input image 304. The mask image geometry 366 may identify the positions and shapes of features of the mask image 362 by including information such as the coordinates of points on each feature, e.g., the coordinates of one or more points on each of the eyes 370, mouth 372, and nose 374 in the mask image 362. The points on a feature may be, e.g., the left, right, top, and bottom coordinates of the feature. The particular points that are included for a feature may be defined according to the shape of the feature. For example, for a rectangular feature, the points in the mask image geometry may include the four corners of the feature. The mask geometry 366 may include quantities other than coordinates. For example, for a circular feature, the geometry may include a center point and a radius, and so on.

As an example, a dynamic panda mask 362 such as that used to generate the output image 334 may include a mask image 362 that depicts the panda facial features 370, 372, 374 to be applied to eyes 308, a nose 310, and a mouth 312, respectively, of an input image. The coordinates on the mask image 362 of the panda features, including the eyes 370, nose 372, and mouth 374, may be included in the geometry 366 of the dynamic panda mask 360. These coordinates may be used to adjust the size of the panda mask image 362 so that the mask image features are in the locations of the corresponding existing facial features 308, 310, 312 in the input image 304. The adjustment may be performed by mask transformation instructions 364 invoked by the mask application component 330 or by transformation instructions that are included in the mask application component 330 itself.

After the panda mask 360 has been applied to the input image 304, the output image 334 includes the panda facial features from the mask image, e.g., the eye features 338, nose feature 340, and mouth feature 342. These features have been copied from the panda mask image 362 and resized or repositioned to match the arrangement of the corresponding existing features 308-312 on the face of the object 306 in the input image 304. The coordinates of the existing features 308 on the face of the object 306 to which the mask is to be applied may be determined using image recognition techniques, e.g., image segmentation or the like. Although facial features are described as examples of features that may be applied using masks, other types of features may be used. In other examples, the features of a particular type of object may be used for objects that are not faces or human heads.

As an example, a dynamic mask 360 to be applied to images of chairs 314 may include one or more mask images 362 to be applied to the chair images, e.g., images of fabric covers for the chair back and chair seat. The mask images 362 may have associated mask geometries 366 that include points on the mask images 362. In this example, the chair cover mask geometry 366 may include the coordinates of points on a chair back cover mask image 362 that are to correspond to the top left and right corners of the back of the chair 314 in an input image 304. The mask geometry 366 may also include the coordinates of points of a chair seat cover mask image that are to correspond to the corners of the seat of the chair 314 in the input image 304.

To apply the example chair back cover mask 360 to an input image 304 and generate an output image 334, the mask application component 330 may determine an alignment (e.g., movement of the back cover mask image 362 in the x and/or y directions) and, if appropriate, a size scale factor (to enlarge or reduce the mask image 362 in the x and/or y directions) so that the back cover mask image 362's features are positioned at the corresponding points on an input image 304. The corresponding points may be, e.g., the top left and right corners of the back of the chair object 314 depicted in the input image 304. The seat cover mask may be applied to an input image similarly. The pixels of each mask image 362 may then be copied to (or used as values for) each portion of the output image covered by the mask image according to the mask geometry 366. Pixels not covered by a mask image 362 may be copied to (or used as values for) the remaining portions of the output image 334. As an alternative to repositioning and resizing the mask image 362 to match the geometry of the input and/or output image 304, 334, the input and/or output image may be repositioned and resized to match the geometry of the mask image 362.

In particular embodiments, a dynamic mask 320 defined for a particular type of object may be applied to other types of objects by scaling, e.g., adjusting the size of, the mask image 322 to fit the other type of object. The size of the mask image 322 may be adjusted by enlarging or reducing the mask image 322 in the x or y direction as appropriate so that the size of the mask image is similar to the size of the portion of the output image 334 to which the mask image 360 is to be applied. As another example, the mask image 360 may be scaled so that the outer borders of the mask image 332 fit within the borders of the object to which the mask image 322 is to be applied. For example, the mask image 362 may be scaled to fit within the boundaries of the chair object 906 in the input image 904. The result of applying the mask image 362 to the input image 904 is shown as the output image 934, in which the mask features 938, 940, 942 appear within the boundaries of the back of the chair 936.

In particular embodiments, a dynamic mask 320 defined for a particular type of object may be applied to other types of objects using a geometry transformation to resize and reposition the mask features as needed to fit the other types of objects. The geometry transformation may be performed by mapping the existing features of the particular type of object to features of the other type of object. For example, a dynamic mask 320 having a geometry 366 that is defined in terms of existing features of a particular object expected to be present in an input image 304 may be applied to another type of object by mapping the existing features of the particular type of object to existing features of the other type of object, so that the coordinates of the particular object type's features can be transformed to coordinates of the other object type's features.

Facial masks, for example, which may be defined in terms of existing features of a human face, may be applied to other types of objects by defining a mapping between the facial features and features of the other types of objects. For example, a facial mask may be applied to a chair by establishing an association between each facial feature of the facial mask geometry with a corresponding feature of the chair geometry. As another example, the eyes of the facial geometry may be associated with the upper left and right corners of the chair, the nose with the middle of the back of the chair, and the mouth with the seat of the chair. In this example, applying the panda dynamic mask 360 to a chair in an input image 304 may result in the panda eye features 370 being included in an output image 334 at or near (e.g., surrounding) the top left and right corners of the chair, the panda nose feature 372 being included in the output image 223 in the geometric center of the back of the chair, and the panda mouth feature 374 being included in the output image 334 at the location of and having the size of the seat of the chair. The result of applying the mask image 362 to the input image 904 is shown as the output image 934, in which the mask features 938, 940, 942 appear within the boundaries of the back of the chair 936.

In particular embodiments, the mask instructions 364 may include computer program code 368 specific to that dynamic mask 360 which, when executed by a processor, render the mask features based on each received input image 304 on an output image 334. The program code 368 may be able to render more complex masks, such as animated masks, than mask instructions that are represented by the geometry 366 and use coordinate transformations as described above.

In particular embodiments, the mask selection component 320 may automatically select one or more dynamic masks 360 from a mask database 322, or other data source, to be applied to an input image 304. The dynamic masks 360 may be selected based on one or more input images 304, e.g., based on emotions 352 detected in the input images 304. Other factors 350, such as factors related to the user of the client device 130, may also be used to select dynamic masks 360. These other factors may include user-profile information 354, social data 356 related to the user and their social network, a mask theme 358, such as a theme in which the user is interested, other user interests 360, and location data 362 that may identify the user's geographical location. Although the object on which the dynamic mask selection is based is ordinarily a human face, images or videos of other objects may be used instead, e.g., an animal face, an image that has features of a human face, such as a caricature or cartoon illustration of a face, or other objects such as real-world masks, an object having features that resemble eyes and a mouth, an emoticon, and so on.

In particular embodiments, to identify emotions 362 in the input image, the emotion identification component 316 may use any appropriate emotion recognition technique, such as, without limitation, identifying the shapes of facial features and comparing those shapes to shapes that are known to correspond to particular emotions. For example, if the mouth 312 in an image 304 is in the shape of a smile, then the emotion identification component 316 may identify the emotion "happiness" in the image 304. The smile may be detected, for example, by identifying points on the mouth 312, such as the top, bottom, left, and right points of the mouth 312, and determining that the points are arranged in the shape of a smile. The emotion identification component 316 may then determine that the emotion associated with the smile is "happiness" as an emotion associated with smiles. In one example, an expression-to-emotion mapping table that maps facial expressions to emotions may be searched for the expression "smile" to find the result "happiness." In another example, machine-learning techniques may be used to compare the shape of facial features 308, 310, 312 in a particular image 304 to shapes of those features in a set of training images that are known to represent particular emotions. The emotions 352 may be selected from a set of recognizable emotions, such as happiness, sadness, anger, surprise, disgust, and fear. Emotions may be identified based on objects other than faces or facial features. As an example, if the input image depicts a heart-shape, such as that made by two hands touching at the fingertips and palms, with the fingertips below the knuckles, then the emotion "likes" or "feeling loved" may be identified. Note that the emotions described herein are used for illustrative purposes. The set of recognizable emotions may include additional or different emotions, e.g., amusement, disdain, skepticism, like, dislike, and so on. The techniques described herein for identifying emotions based on images are described as examples and not by way of limitation. Any appropriate technique for identifying emotions based on input images may be used to perform the operations of the emotion identification component 316.

FIG. 4A illustrates an example emotion-to-mask table 400 that represents a mapping between emotions and masks. A mask selection component 320 may select a dynamic mask 362 based on an emotion 352. As an example, mask selection component 320 may select a dynamic mask 362 from the emotion-to-mask table 400 based on the name of a detected emotion. The example emotion-to-mask table 400 maps the emotion "happiness" to a mask named "happy panda," the emotion "surprise" to a mask named "surprised eyes," the emotion "anger" to a mask named "angry bird," and the emotion "sadness" to a mask named "gushing tears." The selection may be performed by using the emotion-to-mask mapping table 400 to identify the dynamic mask 360 that corresponds to one or more emotions 352 identified in the input images 304. For example, if one particular emotion is detected in the input images 304, then the emotion-to-mask mapping 400 table may be searched for an entry that maps the emotion to a particular dynamic mask, and that dynamic mask may be used as the selected mask. As another example, if surprise is detected in a video, then the "surprised eyes" dynamic mask associated with "surprise" may be selected. In particular embodiments, if multiple emotions are detected in the input images 304, then the emotion-to-mask table 400 may be used to identify a mask for each detected emotion. Multiple masks may be applied to an input image, e.g., by applying each mask to the image in succession. Alternatively, a single mask may be selected by searching a mask selection table 402 for a mask that is a better match for the particular emotions detected and/or satisfies criteria based on other factors, as shown in FIG. 4B and described below.

In particular embodiments, detecting emotions may involve uncertainty as to which particular emotion has been detected. The emotion identification component 316 may generate a confidence value for each identified emotion. The confidence value may be between 0 and 1, with 0 representing the lowest confidence and 1 representing the highest confidence that the emotion has been correctly identified. The confidence values of the detected emotions may be used as factors in mask selection. In particular embodiments, one or more mask selection conditions may be associated with each dynamic mask 360. The selection conditions for a particular mask 360 may specify particular emotions, e.g., "surprise," and associated threshold confidence values, e.g., 0.9. The mask may be selected when, e.g., one or more of the specified emotions are detected with confidence values that are greater than or equal to the associated threshold confidence values specified in the mask selection table 402 for those emotions. The selection conditions for a particular mask 360 may be based on other factors, and the mask may be selected when one of the factors has a value that matches or satisfies a specified value or range associated with the mask's selection condition. The values may be particular words or numbers, or ranges of numbers, for factors such as user-related attributes. For example, for a "location" factor, a mask may specify that the mask's selection condition is satisfied when an attribute named "location" associated with the user has the value "zoo."

The value of an attribute associated with a mask selection condition may be compared to the value of a corresponding attribute of a particular user by the mask selection component 320 to determine whether to select a particular mask. The attributes may be, e.g., values for the mask selection factor 350, such as one or more emotions 352 (which may be emotion names and optional threshold confidence values), user profile data 354, social data 356, mask theme 358, user interests 380, and location data 382, or the like.

In one example, one or more particular emotion thresholds and one or more other factors may be included in the mask selection condition. The associated mask may be selected when at least one of the included thresholds or factors is satisfied. Alternatively, the associated mask may be selected when all of the included thresholds and factors associated with the mask are satisfied. If more than one mask may be selected, e.g., because the selection conditions for multiple masks are satisfied, then a score may be calculated for each mask, and the mask having the highest score may be selected. The score for a mask may be based on the number of thresholds and factors that are satisfied for the mask, as described below with reference to FIG. 4B.

In particular embodiments, the mask selection table 402 may associate threshold emotion confidence values with each dynamic mask, so that a mask is selected if at least one of its emotion threshold values is satisfied (e.g., met or exceeded) by the confidence value associated with one of the corresponding detected emotions. The confidence values associated with a mask ordinarily add up to 1.0. For example, the emotion identification component may identify the emotion "happiness" with confidence 0.3 and "sadness" with confidence "0.5" in an input image 304. In one example, a mask associated with happiness threshold of 1.0 or a sadness threshold of 1.0 is not satisfied by these confidence values, and is not selected.

In another example, a mask associated with a happiness threshold of 0.1, such as the "gushing tears" mask listed in the table of FIG. 4B, is satisfied by a detected happiness emotion having a confidence of 0.1 or greater. The "gushing tears" mask is thus satisfied by the example happiness emotion having confidence 0.3 (e.g., corresponding to tears of joy). That is, the "gushing tears" mask has a low threshold for being selected when the happiness emotion is detected. Further, the "gushing tears" mask is associated with a sadness threshold of 0.9. In the preceding example, a mask's threshold condition is satisfied when at least one of its associated threshold values is satisfied. Masks for which more threshold conditions are satisfied than other masks, or for which threshold conditions are satisfied more closely than other masks (e.g., a confidence value of 0.8 is closer to a threshold of 0.9 than is a confidence value of 0.7), may be ranked higher (e.g., assigned a higher ranking score) than such other masks when selecting masks. Alternatively, a mask's threshold condition may be defined so that it is satisfied when all of its associated threshold values are satisfied.

As introduced above, factors 350, such as factors other than or in addition to emotions 352, may be used to select dynamic masks 360. These other factors may include user-related factors such as user-profile information 354, social data 356 related to the user and their social network, a mask theme 358, such as a theme in which the user is interested, other user interests 380, and location data 382 that may identify the user's geographical location. One or more of the factors 350 may be associated with a user, e.g., by inclusion in the user's profile, by edges in the social-graph that associate particular values of the factors 350 with the user's social-graph node. The mask selection component 320 may determine whether to select a dynamic mask 360 for a user based at least in part on how many of the mask selection factors associated with the user match corresponding mask selection factors associated with the mask 360. The user may be the user of the client system 130, e.g., the user who performed an operation that caused a mask to be selected. Alternatively, the user may be a user identified in the input image or video using facial recognition or other appropriate technique.

In particular embodiments, the other factors 350 may be combined with emotion detection so that, for example, detection of an emotion 352 with a low or medium confidence level may be combined with the user's interest in the "animal" theme 358 or visit to a zoo location 382 to select a mask associated with the emotion 352 and with the "animal" theme 358 or the "zoo" location 382. The mask selection table 402 indicates that a happy panda mask 360 can be selected when at least one of the following is satisfied: the user is interested in the "animals" theme, the user is located at a zoo, or the emotion of happiness is detected in the input image 304. Alternatively, the happy panda mask may be selected when all of those three conditions are satisfied. As another alternative, the happy panda mask may be selected when the emotion of happiness is detected with a specified threshold confidence value, e.g., 0.5 or greater confidence.

In particular embodiments, the mask selection component 320 may select a dynamic mask based on a user profile 354 associated with a user of the client system 130. Information in or associated with a user's user profile may be compared to user profile information 354 associated with a dynamic mask 360 as part of determining whether to select the mask 360 for the user. The user profile information may include, e.g., the user's name, hometown, age, and other demographic information.

In particular embodiments, the mask selection component 320 may select a dynamic mask based on social data 356 associated with a user of the client system 130. Social data, such as data stored in entity or user nodes connected to the user's user node, may be compared to social data 356 associated with a dynamic mask 360 as part of determining whether to select the mask 360 for the user. The social data may include information from a social graph, such as information related to the user's friends on the social-networking system, e.g., the names, locations, and other information related to the user's friends. The social data may also include information related to locations the user visits or likes, such as particular businesses, restaurants, events, and so on.

In particular embodiments, the mask selection component 320 may select a dynamic mask based on a mask theme associated with a user of the client system 130. Variations of a mask may be associated with different emotions. The variations of the mask may depict different emotions of a particular character or other theme. For example, there may be happy and sad dynamic masks associated with the Pikachu character that show happy and sad Pikachu faces, respectively. The happy and sad Pikachu faces may be depictions of different emotions (e.g., happy and sad) of the same character. These masks for different emotions may be represented in the mask selection table 402 so that they may be selected when their associated selection conditions are satisfied. The mask selection table 402 may include an entry for each variation of the mask with the appropriate threshold values. For example, the happy Pikachu mask may have an entry in the mask selection table 402 that includes the "happiness" emotion threshold 1.0 so that the happy Pikachu mask is selected when the emotion "happiness" is detected with a confidence value of 1.0. The happy Pikachu mask may be associated in the mask database table 404 with a mask image of a smiling Pikachu face. The sad Pikachu mask have an entry in the mask selection table 402 that includes the "sadness" emotion threshold 1.0 so that the sad Pikachu mask is selected when the emotion "sadness" is detected with a confidence value of 1.0. The sad Pikachu mask may be associated in the mask database table 404 with a mask image of a frowning Pikachu face. The appropriate mask may be selected and applied to an input image based on whether the emotion detected in the input image is happiness or sadness.

In particular embodiments, a user may be associated with a theme, which may be a name of a topic, subject, entity, e.g., "animals," "movies,", "Pokemon," category, or the like. The themes associated with a user may be compared to themes 358 associated with a dynamic mask 360 as part of determining whether to select the mask 360 for the user. A user may establish an association with a theme by, e.g., expressing interest in the theme, e.g., indicating that they like the theme. An association between a user and a theme may be established automatically, e.g., by the social-networking system 160, based on a user's actions. For example, entities that the user frequently interacts with on the social-networking system 160, frequently mentions in posts or messages, frequently searches for, or is liked by the user's friends, may be identified as themes and associated with the user. As another example, the mask selection component 320 may select a dynamic mask based on user interests 360 associated with a user of the client system 130. User interests 360 may be handled similarly to themes 358, through user interests may include entities that are not necessarily considered themes.

Themes may be selected from a defined set of themes, while user interests may contain any appropriate words that identify the user's interests. For example, the happy and sad Pikachu mask entries in the mask selection table 402 may also include the value "Pokémon" in the theme column, in which case the Pikachu masks may be displayed only if the respective emotion threshold is met and the user is associated with the theme "Pokémon," e.g., the user has referenced the word "Pokémon" in posts or messages, has liked the entity "Pokémon," or has otherwise expressed an interest related to "Pokémon."

In particular embodiments, the mask selection component 320 may select a dynamic mask based on location data associated with a user of the client system 130 or with the client system 130 itself. Location data, such as the user's current geographic location, past geographical locations, names of locations the user has visited, and the like, may be compared to location data 382 associated with a dynamic mask 360 as part of determining whether to select the mask 360 for the user. For example, the happy panda mask 360 may have an associated location data 382 mask selection factor with the value "zoo" to indicate that the mask 360 may be selected when the user's location includes the value "zoo." If the user is presently at a zoo, and location data associated with the user contains the word "zoo," then the mask 360 may be selected. The user's location data may contain the word "zoo" when, e.g., the social-networking system 160 determines that the user is at or has previously visited a zoo, based on the geographical location of the client device 130 on a check-in by the user at a zoo, or the like.

FIG. 4B illustrates an example dynamic mask selection table 402. The mask selection table 402 associates multiple emotions with each mask. The mask selection table 402 includes threshold confidence values for each combination of emotion and mask in the table 402. The threshold confidence values for the "happy panda," "surprised eyes," and "angry bird" masks are set so that those three masks are associated with the same emotions as in the table 400 of FIG. 4A. That is, the threshold confidence value of "happiness" is 1.0 for the "happy panda" mask, the confidence value of "surprise" is 1.0 for the "surprised eyes" mask, and the confidence value of "anger" is 1.0 for the "angry bird" mask. Since the confidence thresholds are 1.0, each of these three masks may only be selected when the corresponding emotion having a threshold of 1.0 is detected with a confidence of 1.0. The "gushing tears" mask, however, is associated with a happiness threshold of 0.1 and a sadness threshold of 0.9, so the "gushing tears" mask may be selected when either of those emotions is detected with a sufficiently high confidence (0.1 for happiness, and 0.9 for sadness).

The mask selection table 402 further includes values for other mask selection factors, such as the theme, location, age, and gender factors. The "happy panda" mask has a value of "animals" for its theme factor, a value of "Zoo" for its location factor, and a value of "1-18" for its age factor. For example, if a user of the client device 130 for whom the mask is being selected likes the theme "animals," then the Theme factor is satisfied for the "happy panda" mask. That is, the "happy panda" mask is more likely to be selected for a user who likes the theme "animals." Further, if the user is located at a Zoo when the mask is being selected, then the Location factor is satisfied for the "happy panda" mask. If the user's age is between 1 and 18, then the Age factor is satisfied for the "happy panda" mask. The "angry bird" mask has a value of "games" for its theme factor, and a value of "1-30" for its age factor. That is, if a user for whom the mask is being selected likes the theme "games," then the Theme factor is satisfied for the "angry bird" mask. Further, if the user's age is between 1 and 30, then the Age factor is satisfied for the "angry bird" mask. Masks for which more factors are satisfied are more likely to be selected than masks for which fewer factors are satisfied. For example, each mask selection factor that is satisfied, e.g., each emotion and each theme, location, age, or gender factor, may increase a score associated with the mask. When a mask is to be selected, the mask having the highest total score may be selected in preference to other masks having lower total scores.

FIG. 4C illustrates an example dynamic mask database table 404. The dynamic mask database 322 is shown as a mask database table 404 that includes a row for each dynamic mask 360 in the database. The example mask database table 404 contains example dynamic masks 360 named "happy panda," "surprised eyes," "angry bird," and "gushing tears." For each mask, a "mask name" column specifies the name of each mask, and a "mask image" column specifies an image (e.g., a name of a JPEG file) that contains the mask image 362. Further, "mask image geometry" columns, labeled "eye location," "nose location," and "mouth location," specify the mask geometry 366 of each dynamic mask 360. The mask geometry 366 in the mask database table 404 is specified as a set of points for each feature, e.g., left, right, top, and bottom point coordinates of the eye feature's location. The points are abbreviated (L, R, T, B), and the (x,y) coordinate values of the points of each feature are represented by names such as PandaEyeCoords for the coordinates of the left, right, top, and bottom coordinates of the panda eye feature. The coordinates may be relative to an origin point of the mask image 362, e.g., relative to the upper-left point of the mask image 362. The mask database table 404 also includes mask instructions 368 for each dynamic mask 360. The mask instructions 368 may be the geometry specified in the mask image geometry columns, as shown by the "geometry mapping" value of the mask instructions for the "happy panda" mask. Alternatively, the mask instructions 368 may be computer program code for rendering the mask image, as shown by the "rendering code" value in the mask instructions column for the "surprised eyes," "angry bird," and "gushing tears" masks. The rendering code may render the mask effects 361 (e.g., graphical features to be included in the output image), e.g., by resizing and positioning a mask image 362, or by using appropriate drawing operations to draw lines and other shapes, fill in shapes, animate shapes, and so on.

Figure 5A:
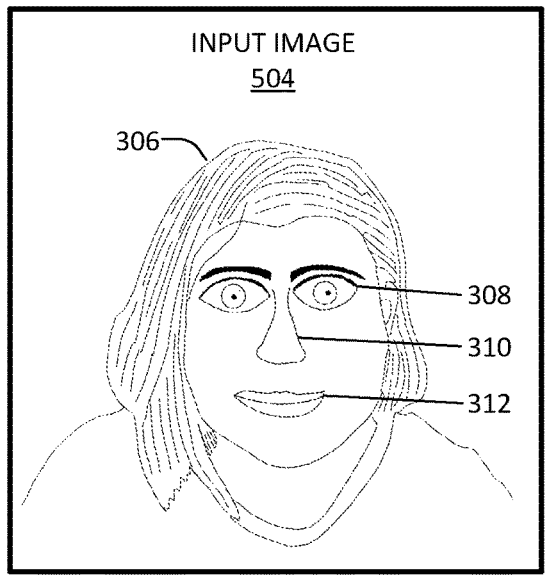
FIG. 5A illustrates an example image of a face having features associated with happiness.
Figure 5B:
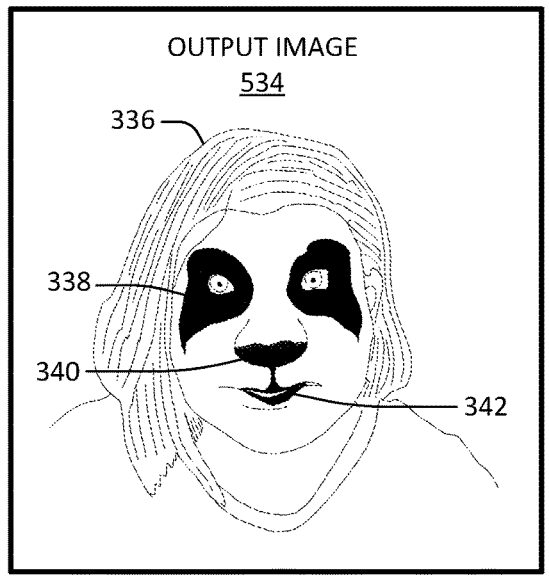
FIG. 5B illustrates an example image in which a panda mask has been applied to a face.

FIG. 5A illustrates an example image 504 of a face having features associated with happiness. The face is a portion of a head object 306 and includes the following features: eyebrows 308, a nose 310, and a smiling, close mouth 312. FIG. 5B illustrates an example image 534 in which a "happy panda" mask has been applied to the face from the image 504. The "happy panda" mask may be selected by the mask selection component 320 when an appropriate corresponding emotion, such as happiness, is detected in the input image. The "happy panda" mask may be selected for the input image 504 because the face in the image 504 is smiling, and the emotion identification component 316 may identify happiness as an emotion present in the image 504 based on these features. The "happy panda" mask 360 replaces portions of a face in the input image with panda face features. The "happy panda" mask 360 may be implemented as a geometry mapping that applies a mask image of a bird's head to an input image, e.g., by resizing and scaling the bird's head mask image to fit a face depicted in the input image. Alternatively, the "happy panda" mask 360 may be implemented as rendering code that draws panda face features around the eyes, below the nose, and at the location of the mouth depicted in the input image.

Figure 6A:
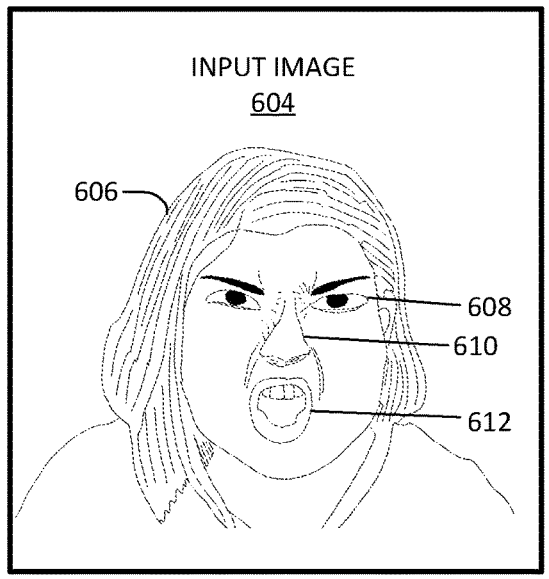
FIG. 6A illustrates an example image of a face having features associated with anger.
Figure 6B:
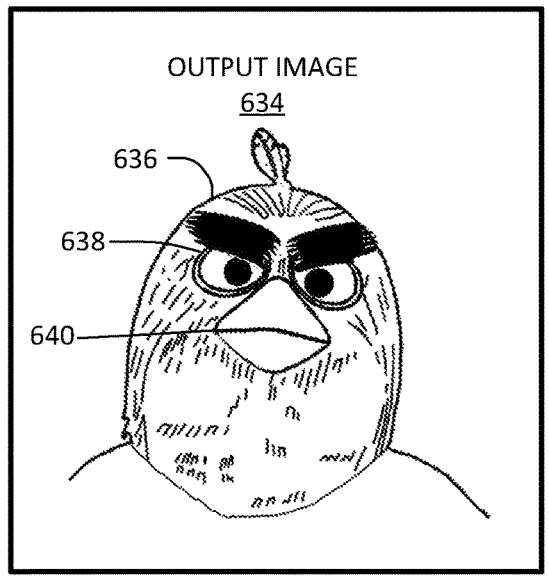
FIG. 6B illustrates an example image in which an angry bird mask has been applied to a face.

FIG. 6A illustrates an example image 604 of a face having features associated with anger. The face is a portion of a head object 606 and includes the following features: eyes 608, a nose 610, and an open mouth 612. FIG. 6B illustrates an example image 634 in which an "angry bird" mask has been applied to the face from the image 604. The "angry bird" mask may be selected by the mask selection component 320 when an appropriate corresponding emotion, such as anger, is detected in the input image. The "angry bird" mask may be selected for the input image 604 because the face in the image 604 has features correlated with anger, such as eyebrows angled inwards toward the node, partially-squinting eyes, and an open mouth, and the emotion identification component 316 may identify anger as an emotion present in the image 604 based on these features. The "angry bird" mask may replace most or all of a face in the input image with a bird's head, which may be implemented as rendering code that draws animated bird eyes and eyebrows based on the user's facial expression (e.g., the position of the user's eyes and eyebrows) or as a geometry mapping that applies a mask image of a bird's head to an input image, e.g., by resizing and scaling the bird's head mask image to fit a face depicted in the input image.

Figure 7A:
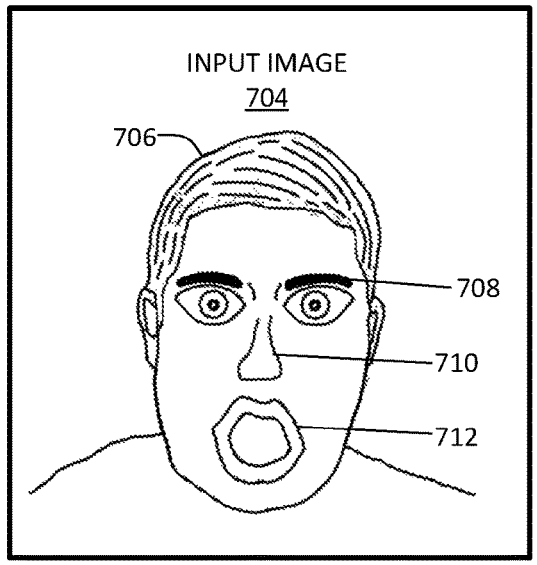
FIG. 7A illustrates an example image of a face having features associated with surprise.
Figure 7B:
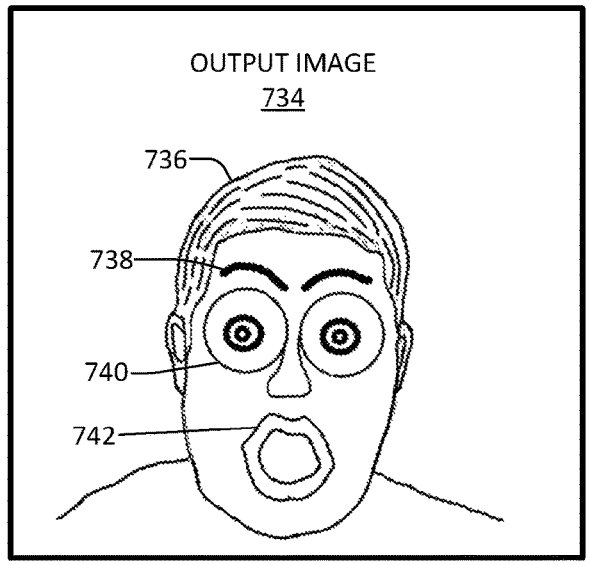
FIG. 7B illustrates an example image in which a surprised eyes mask has been applied to a face.

FIG. 7A illustrates an example image 704 of a face having features associated with surprise. The face is a portion of a head object 706 and includes the following features: eyebrows 708, a nose 710, and an open mouth 712. FIG. 7B illustrates an example image 734 in which a "surprised eyes" mask has been applied to the face from the image 704. The "surprised eyes" mask may be selected by the mask selection component 320 when an appropriate corresponding emotion, such as surprise, is detected in the input image. The "surprised eyes" mask may be selected for the input image 704 because the face in the image 704 has features correlated with surprise, such as wide-open eyes and an open mouth, and the emotion identification component 316 may identify surprise as an emotion present in the image 704 based on these features. The "surprised eyes" mask may replace eyes in the input image with large round eyes, and may be implemented as rendering code or as a geometry mapping that applies a mask image of round eyes to an input image, e.g., by resizing and scaling the round eyes mask image to fit a face depicted in the input image.

Figure 8A:
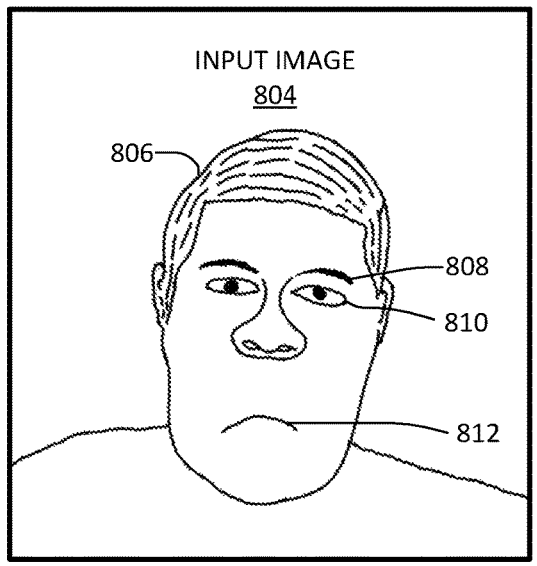
FIG. 8A illustrates an example image of a face having features associated with sadness.
Figure 8B:
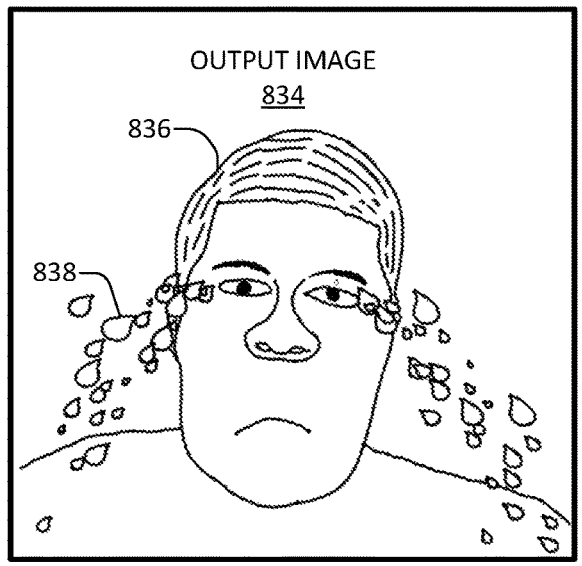
FIG. 8B illustrates an example image in which a gushing tears mask has been applied to a face.

FIG. 8A illustrates an example image 804 of a face having features associated with sadness. The face is a portion of a head object 806 and includes the following features: eyebrows 808, eyes 810, and a frowning, close mouth 812. FIG. 8B illustrates an example image 834 in which a "gushing tears" mask has been applied to the face from the image 804. The "gushing tears" mask may be selected by the mask selection component 320 when an appropriate corresponding emotion, such as sadness, is detected in the input image. The "gushing tears" mask may be selected for the input image 804 because the face in the image 804 is frowning, and the emotion identification component 316 may identify sadness as an emotion present in the image 504 based on these features. The "gushing tears" mask may replace portions of a face in the input image with graphical images of tears, which may be implemented as rendering code that draws animated tears based on a facial expression in the input image (e.g., the position of the face's eyes and eyebrows, or whether the face's mouth is open), or as a geometry mapping that applies a mask image of tears to an input image, e.g., by resizing and scaling the tears mask image to fit a face depicted in the input image.

FIG. 9A illustrates an example input image 904 having multiple objects including a head object 906. The head object 906 includes a face, eyebrows 308, a nose 310, and a smiling, closed mouth 312. The image 904 also includes a chair object 906, which depicts a front view of a chair, and a poster object 914 that includes a Cheshire Cat object 916. The Cheshire Cat 916 has a head, which includes a smiling face. The cat's head and face may be considered objects. The cat's eyes and mouth may be considered features of the face object. Other categorization into objects and features are possible. For example, the cat 916 may be considered an object, and the cat's head and face, including the eyes and mouth, may be considered features of the cat object.

Figure 9B:
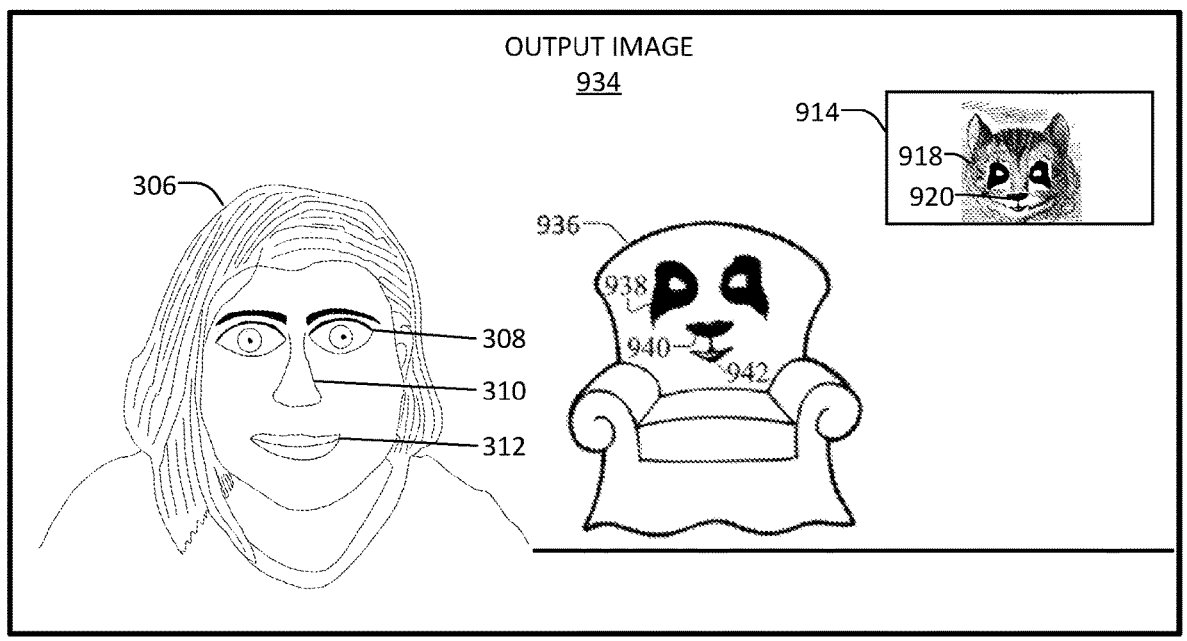
FIG. 9B illustrates an example output image in which a mask is applied to an object after being selected based on a different object.

FIG. 9B illustrates an example output image 934 in which a dynamic mask 360 is selected based on a first object and applied to a second object. A panda face dynamic mask 360 is selected based the human head object 306, and applied to a different object in the input image 904, e.g., a chair 906 or cat 916. The first object thus provides an emotion, a mask is selected based on the emotion, and the second object provides a subject to which the mask is applied. As an example, the "happy panda" mask may be selected by the mask selection component 320 when an appropriate corresponding emotion, such as happiness, is detected in the input image. The "happy panda" mask has been selected for the input image 904 because the face of the head object 306 in the image 904 is smiling. The "happy panda" mask 360 replaces portions of a face in the input image with panda face features. The "happy panda" mask 360 may be implemented as a geometry mapping that applies a panda mask image of panda face features to an input image, e.g., by resizing and scaling the panda mask image to fit a user-designated or otherwise identified object depicted in the input image 904, such as the chair 936. Alternatively, the "happy panda" mask 360 may be implemented as rendering code that draws panda face features at sizes that fit within the boundaries of the designated object, e.g., the chair 936.

In another example, as introduced above, the emotion may be detected based on objects in the input image 904 other than the face of the head 306. A Cheshire Cat appears on a poster 914 in the input image 904. The cat is smiling, and the emotion identification component 316 may identify the emotion "happiness" from the input image 904 based on the cat instead of the human head 306. Thus if the head 306 is not present in the image 904, the panda mask 360 may be selected based on the cat in the poster 914. As another example, a user may designate the head object 306 or the cat in the poster object 914 as an object to be used for emotion detection, in which case a portion of the input image 304 that includes the designated object (but not the other object) may be provided to the emotion identification component 316 so that the emotion 352 is selected based on the designated object.

In particular embodiments, the first and second objects may be from different input images, such as other images 326. For example, the first object may be from an input image received from a front-facing camera of the client device 130, e.g., a camera that captures an image of the user of the device 130 as they are facing the device's screen. The second object may be from a different input image 326, e.g., an input image received from a rear-facing camera that faces away from the user. The first input image 904 may be a photo of the user's face, and the second input image 326 may be a photo of furniture such as a chair or other object in the user's field of vision. An emotion may then be identified in the first input image, a mask selected based on the emotion, and the mask applied to an object in the second input image such as the chair.

Thus, FIG. 9B illustrates an example of selecting a panda mask 360 based on a human face first object 306 and applying the panda mask 360 to a second object, which may be a chair or a cat face in this example. Selecting the mask 360 may involve identifying an emotion associated with an identified first object 306 in one or more input images, e.g., the face. The first object 306 may be the head object 906, for example. The mask 360 may be selected from a plurality of masks based on the emotion. The mask 360 may include one or more mask effects 361, such as a panda face mask image 362, to be incorporated into an output image 934.

The output image 934 may be generated by applying the mask 360 to the input image 904. Applying the mask 360 may generate graphical features 938-940 for the second object 936 in the output image 934 based on the second object 906 in the input image 904 and the mask effects 361. The graphical features 938-940 may be generated according to instructions specified by the mask effects 361. For example, the mask image 362 of the mass effects may be repositioned or resized so that features 370-374 are aligned with the second object 936 and have the appropriate size to fit the second object 936. The output image 934 thus may include a scaled copy of the mask image 362.

In another example, the second object may be the Cheshire Cat 916 depicted on the poster 914. Applying the mask to the cat second object 916 may generate an output object 918 in the output image 934, and the cat output object 918 may include one or more panda face graphical features 920 generated by the panda face mask effects 361 based on the identified cat second object 916 (e.g., positioned and resized to be aligned with corresponding features of the cat second object 916, such as the cat's eyes, nose, and mouth, which are aligned with the eyes 370, nose 372, and mouth 374 of the mask image 362, respectively). Thus, shapes of the panda face graphical features 920 generated based on the mask effects 361 are based on shapes of corresponding cat face graphical features of the cat second object 916. Further, locations in the output image 934 of the panda face graphical features 920 generated based on the mask effects 361 are based on locations of the corresponding features of the cat second object 916 in the input image 904.

Figure 10:
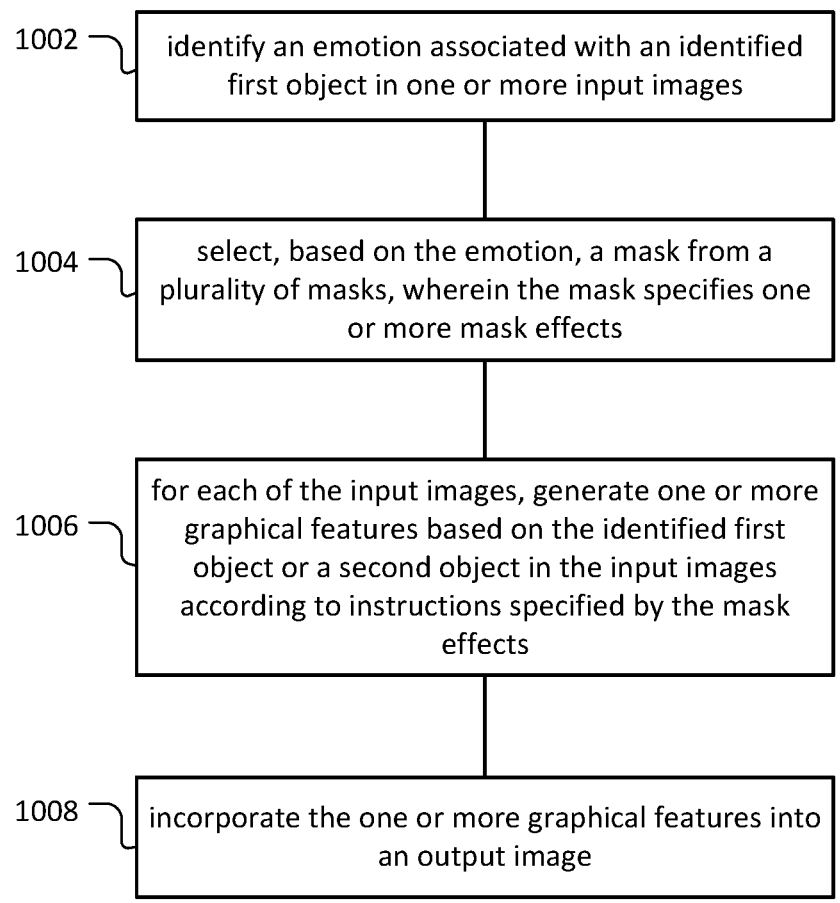
FIG. 10 illustrates an example method for selecting and applying dynamic masks.

FIG. 10 illustrates an example method 1000 for selecting and applying dynamic masks. The method 1000 begins at step 1002 by identifying an emotion associated with an identified first object in one or more input images. Step 1004 may select, based on the emotion, a mask from a plurality of masks, where the mask specifies one or more mask effects. Steps 1006 and 1008 may apply each of the masks to the output image. Step 1006 may generate one or more graphical features based on the identified first object or a second object in the input images according to instructions specified by the mask effects. Step 1008 may incorporate the one or more graphical features into an output image.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for selecting and applying dynamic masks including the particular steps of the method of FIG. 10, this disclosure contemplates any suitable method for selecting and applying dynamic masks including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
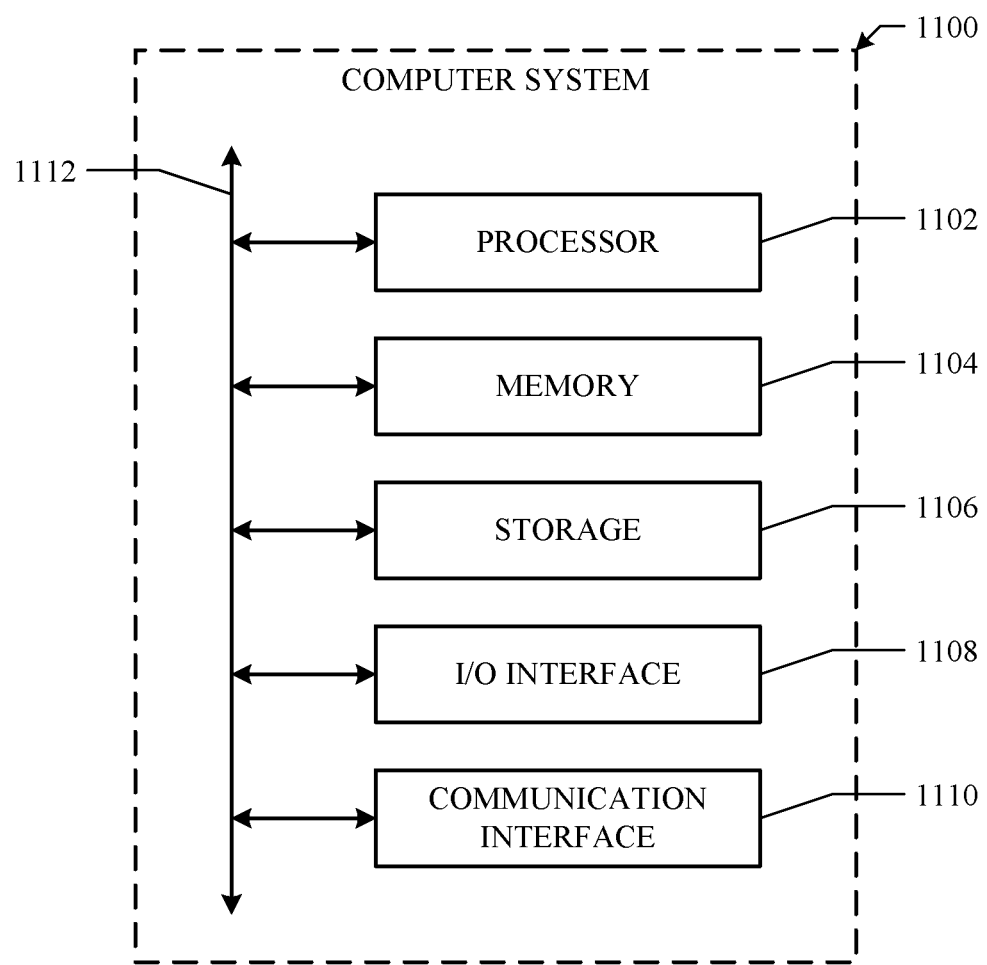
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computer system, identifying an expression associated with an identified first object in an input image, wherein the identified first object has one or more attributes;
    by the computer system, accessing social data of a first user associated with the input image, wherein social data comprises information from a social graph of an online social network;
    by the computer system, selecting, based on the identified expression and the social data of the first user, a mask from a plurality of masks, wherein the plurality of masks comprise masks previously selected by friends of the first user within the online social network, wherein the mask specifies one or more mask effects and displays a stylized expression corresponding to the identified expression; and
    by the computer system, applying the mask to the input image, wherein applying the mask comprises:
        generating one or more graphical features based at least in part on the stylized expression reflective of the expression associated with the identified first object according to instructions specified by the mask effects; and
        incorporating the one or more graphical features into the input images to generate an output image, wherein the graphical features are incorporated based on the one or more attributes of the first object.

2. The method of claim 1, wherein the expression is identified based on one or more graphical features of the identified first object.

3. The method of claim 2, wherein the graphical features of the identified object comprise one or more facial features.

4. The method of claim 1, wherein the selected mask is selected from a lookup table that maps the identified expression to the selected mask to display the stylized expression reflective of the identified expression.

5. The method of claim 1, wherein the mask is selected from the plurality of masks based further on one or more user-related factors associated with the first user to display the stylized expression reflective of the expression associated with the identified first object.

6. The method of claim 1, wherein the mask is selected from the plurality of masks when a selection condition associated with the mask is satisfied by the social data of the first user.

7. The method of claim 6, wherein the selection condition is satisfied when, for an attribute associated with the social data, a value of the attribute associated with the mask matches a value of the attribute associated with the social data.

8. The method of claim 1, wherein one or more expressions are associated with the mask, and the mask is selected when the identified expression corresponds to at least one of the expressions associated with the mask in order to display the stylized expression reflective of the expression associated with the identified first object.

9. The method of claim 8, wherein the identifying an expression generates a confidence value for the identified expression,
    wherein each of the one or more expressions associated with the mask is further associated with a threshold confidence condition, and the mask is selected when the confidence value satisfies the threshold confidence condition.

10. The method of claim 1, wherein the plurality of masks comprises a first mask that generates one or more first features associated with a first expression of a person or character and a second mask that generates one or more second features associated with a second expression of the person or character,
    wherein the first mask is selected when the identified expression is the first expression, and the second mask is selected when the identified expression is the second expression.

11. The method of claim 1, wherein the mask effects include a mask image, and the graphical features incorporated into the output image include one or more features from the mask image.

12. The method of claim 11, wherein the features from the mask image are scaled based on the size of the first or second object.

13. The method of claim 11, wherein the features from the mask image are positioned in the output image at locations that are determined based on locations of corresponding features of the first or second object in the input images according to mask geometry information associated with the mask effects.

14. The method of claim 1, wherein the graphical features generated by the mask effects to display the stylized expression reflective of the expression associated with the identified first object comprise one or more of: exaggerated facial features, renderings of inanimate physical objects, or stylized facial features.

15. The method of claim 1, wherein the identified first object in the input image comprises an image of a human, human face, animal, animal face, or inanimate object.

16. The method of claim 1, wherein the input image is captured using a camera.

17. The method of claim 1, wherein the input image is a photograph.

18. The method of claim 1, wherein the input image is a video.

19. The method of claim 1, further comprising:
by the computing system, determining a geographic location associated with the input image, wherein selecting the mask from the plurality of masks is further based on the geographic location.

20. The method of claim 1, further comprising:
by the computing system, transforming the mask by modifying one or more graphical features to reflect one or more changes in the one or more attributes and identified expression of the identified first object in a second image successive to the first image.

21. The method of claim 1, wherein the social data comprises information related to the first user stored within an online social network.

22. The method of claim 1, wherein the social data comprises a user profile, user interests, user preferences, user relationships on a social network, and location data.

23. The method of claim 1, wherein the social data comprises attributes related to the first user through nodes and edges of a social graph database.

24. One or more computer-readable non-transitory storage media embodying software that is operable when executed to:
identify an expression associated with an identified first object in an input image, wherein the identified first object has one or more attributes;
access social data of a first user associated with the input image, wherein social data comprises information from a social graph of an online social network;
select, based on the identified expression and the social data of the first user, a mask from a plurality of masks, wherein the plurality of masks comprise masks previously selected by friends of the first user within the online social network, wherein the mask specifies one or more mask effects and displays a stylized expression corresponding to the identified expression; and
apply the mask to the input image, wherein to apply the mask, the software is further operable when executed to:
generate one or more graphical features based at least in part on the stylized expression reflective of the expression associated with the identified first object according to instructions specified by the mask effects; and
incorporate the one or more graphical features into the input images to generate an output image, wherein the graphical features are incorporated based on the attribute of the first object.

25. A system comprising: one or more processors; and a memory coupled to the processors comprising instructions executable by the processors, the processors being operable when executing the instructions to:
identify an expression associated with an identified first object in an input image, wherein the identified first object has one or more attributes;
access social data of a first user associated with the input image, wherein social data comprises information from a social graph of an online social network;
select, based on the identified expression and the social data of the first user, a mask from a plurality of masks, wherein the plurality of masks comprise masks previously selected by friends of the first user within the online social network, wherein the mask specifies one or more mask effects and displays a stylized expression corresponding to the identified expression; and
apply the mask to the input image, wherein to apply the mask, the processor is further operable when executing the instructions to:
generate one or more graphical features based at least in part on the stylized expression reflective of the expression associated with the identified first object according to instructions specified by the mask effects; and
incorporate the one or more graphical features into the input images to generate an output image, wherein the graphical features are incorporated based on the attribute of the first object.

* * * * *